United States Patent
Stadnyk

(10) Patent No.: US 7,458,626 B1
(45) Date of Patent: Dec. 2, 2008

(54) MOTORCYCLE AND WINDSHIELD MOUNT SYSTEM

(76) Inventor: Mark Stadnyk, 5312 Azalea Cir., Ridge Manor, FL (US) 33523

( * ) Notice: Subject to any disclaimer, the term of this patent is extended or adjusted under 35 U.S.C. 154(b) by 143 days.

(21) Appl. No.: 11/591,268

(22) Filed: Oct. 31, 2006

(51) Int. Cl.
*B62J 17/04* (2006.01)
(52) U.S. Cl. .................................................. 296/78.1
(58) Field of Classification Search ................ 296/77.1, 296/78.1, 84.1, 89, 91, 96.14, 96.2, 180.1, 296/180.5; 49/248, 249
See application file for complete search history.

(56) References Cited

U.S. PATENT DOCUMENTS

| | | | | |
|---|---|---|---|---|
| 3,369,836 A * | 2/1968 | Haycock et al. | ............ | 296/78.1 |
| 4,309,056 A * | 1/1982 | Long | ............ | 296/91 |
| 4,355,838 A * | 10/1982 | Hickman | ............ | 296/78.1 |
| 4,479,663 A * | 10/1984 | Morris et al. | ............ | 296/78.1 |
| 4,696,509 A * | 9/1987 | Yagasaki et al. | ............ | 296/96.21 |
| 4,707,017 A | 11/1987 | Minobe et al. | | |
| 4,830,423 A * | 5/1989 | Nebu et al. | ............ | 296/78.1 |
| 4,982,923 A * | 1/1991 | Wanner | ............ | 248/286.1 |
| 5,730,483 A * | 3/1998 | Greger | ............ | 296/78.1 |
| 5,732,965 A * | 3/1998 | Willey | ............ | 280/288.4 |
| 5,745,955 A * | 5/1998 | Patelli et al. | ............ | 296/78.1 |
| 5,788,313 A * | 8/1998 | Willey | ............ | 296/78.1 |
| 5,855,404 A * | 1/1999 | Saunders | ............ | 296/78.1 |
| 6,273,382 B1 * | 8/2001 | Pemberton | ............ | 248/286.1 |
| 6,293,606 B1 * | 9/2001 | Jarosz et al. | ............ | 296/78.1 |
| 6,679,537 B1 * | 1/2004 | Putnam, Jr. | ............ | 296/78.1 |
| 6,709,042 B2 * | 3/2004 | Takemura et al. | ............ | 296/78.1 |
| 6,877,788 B2 * | 4/2005 | Graham | ............ | 296/78.1 |
| 6,905,160 B2 * | 6/2005 | Yoshida et al. | ............ | 296/78.1 |
| 6,948,757 B2 | 9/2005 | Wegener et al. | | |
| 6,974,175 B2 * | 12/2005 | Willey | ............ | 296/78.1 |
| 6,983,973 B2 * | 1/2006 | Suzuki | ............ | 296/78.1 |
| 7,000,971 B2 | 2/2006 | Wegener et al. | | |
| 7,281,750 B1 * | 10/2007 | Wise et al. | ............ | 296/78.1 |
| 2005/0140162 A1 * | 6/2005 | Yamasaki | ............ | 296/78.1 |

FOREIGN PATENT DOCUMENTS

| | | | | |
|---|---|---|---|---|
| DE | 3609595 A1 * | 9/1987 | ............ | 180/219 |
| DE | 3941875 A1 * | 6/1991 | ............ | 296/78.1 |
| JP | 03061192 A * | 3/1991 | ............ | 296/78.1 |
| JP | 03065483 A * | 3/1991 | ............ | 296/78.1 |
| JP | 05254470 A * | 10/1993 | ............ | 296/78.1 |

(Continued)

*Primary Examiner*—D. Glenn Dayoan
*Assistant Examiner*—Paul A Chenevert
(74) *Attorney, Agent, or Firm*—Louis J. Brunoforte

(57) ABSTRACT

Two pair of brackets, each pair have a bottom bracket and a top bracket. Each bottom bracket has a lower section positioned on a recipient surface. Holes extend through the lower section. The holes are positionable over threaded apertures of a recipient surface. Each bottom bracket has an upper section having a hole forwardly and an arcuate slot rearwardly. Each top bracket has an upper section. The upper section is positionable on a windshield. The upper section has holes. The holes extend through the upper section. The holes are positionable over apertures of a windshield. Each top bracket has a lower section formed with two linear slots, an upper rearward slot and a lower forward slot. The slots are provided parallel with each other and at an angle of about 15 degrees with respect to the plane of a windshield. The height and angle of the windshield are infinitely adjustable independently and simultaneously.

4 Claims, 3 Drawing Sheets

FOREIGN PATENT DOCUMENTS

| | | | | | |
|---|---|---|---|---|---|
| JP | 2000159173 | * | 6/2000 | ................ | 296/78.1 |
| JP | 2002087355 A | * | 3/2002 | ................ | 296/78.1 |
| JP | 2006051843 A | * | 2/2006 | ................ | 296/78.1 |
| JP | 2006082810 A | * | 3/2006 | ................ | 296/78.1 |
| JP | 2006096294 A | * | 4/2006 | ................ | 296/78.1 |
| JP | 2007045283 A | * | 2/2007 | ................ | 296/78.1 |

* cited by examiner

MOTORCYCLE AND WINDSHIELD MOUNT SYSTEM

BACKGROUND OF THE INVENTION

1. Field of the Invention

The present invention relates to a motorcycle and windshield mount system and more particularly pertains to independently and infinitely adjusting the height and angle of a windshield with respect to a motorcycle, such adjusting being done separately or simultaneously.

2. Description of the Prior Art

The use of windshield mounts of known designs and configurations is known in the prior art. More specifically, windshield mounts of known designs and configurations previously devised and utilized for the purpose of adjusting a windshield through known methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 4,707,017 issued Nov. 17, 1987 to Minobe relates to an Adjustable Height Windshield Apparatus for Motorcycles. U.S. Pat. No. 5,730,483 issued Mar. 24, 1998 to Greger relates to a System for Adjusting a Windshield for Vehicles. U.S. Pat. No. 6,948,757 issued Sep. 27, 2005 to Wegener relates to a Wind Shield for Motorbikes and Drive Device for a Vehicle Component. Lastly, U.S. Pat. No. 7,000,971 issued Feb. 21, 2006 to Wegener relates to a Windshield for Motorcycles and Drive Means for a Motor Vehicle Component.

While these devices fulfill their respective, particular objectives and requirements, the aforementioned patents do not describe a motorcycle and windshield mount system that allows independently and infinitely adjusting the height and angle of a windshield with respect to a motorcycle, such adjusting being done separately or simultaneously.

In this respect, the motorcycle and windshield mount system according to the present invention substantially departs from the conventional concepts and designs of the prior art, and in doing, so provides an apparatus primarily developed for the purpose of independently and infinitely adjusting the height and angle of a windshield with respect to a motorcycle, such adjusting being done separately or simultaneously.

Therefore, it can be appreciated that there exists a continuing need for a new and improved motorcycle and windshield mount system which can be used for independently and infinitely adjusting the height and angle of a windshield with respect to a motorcycle, such adjusting being done separately or simultaneously. In this regard, the present invention substantially fulfills this need.

SUMMARY OF THE INVENTION

In view of the foregoing disadvantages inherent in the known types of windshield mounts of known designs and configurations now present in the prior art, the present invention provides an improved motorcycle and windshield mount system. As such, the general purpose of the present invention, which will be described subsequently in greater detail, is to provide a new and improved motorcycle and windshield mount system and method which has all the advantages of the prior art and none of the disadvantages.

To attain this, the present invention essentially comprises a motorcycle and windshield mount system. First provided is a motorcycle. The motorcycle has a front and a back. The motorcycle has opposite sides. A vertical central plane is provided through the motorcycle. The motorcycle has a recipient surface. The motorcycle has two rows of four threaded apertures. The apertures are aligned parallel with the central plane, equally spaced, and on opposite sides. The recipient surface has a plane. The plane extends rearwardly at an angle of about 60 degrees from the horizontal.

A windshield is provided. The windshield is fabricated of a transparent, essentially rigid material. The windshield is formed with a top edge. The windshield is formed with a bottom edge. The windshield is further formed with side edges. The windshield has a vertical central plane. The vertical central plane is coextensive with the central plane of the motorcycle. The windshield is essentially in a plane. The windshield has two rows of two apertures. The apertures are aligned parallel with the central plane, equally spaced, and on opposite sides. The apertures of the windshield are wider spaced than the apertures of the motorcycle.

Further provided are two pair of brackets. Each pair of brackets has a bottom bracket and a top bracket. Each bottom bracket has a lower section. The lower section is positioned on the recipient surface. Three holes are provided in the lower section. The holes are positionable over appropriate threaded apertures of the recipient surface for adjustment front and back. Each bottom bracket has an upper section. The upper section has a circular hole. The circular hole is provided forwardly. The upper section has an arcuate slot. The arcuate slot is provided rearwardly. The arcuate slot has a center of curvature at the center of the circular hole. The arcuate slot spans the plane of the recipient surface.

Each top bracket has an upper section. The upper section is positioned in contact with the windshield. The upper section has five holes. The five holes extend through the upper section. The five holes are positionable over the apertures of the windshield. Each top bracket has a lower section. The lower section is formed with two linear slots. The linear slots include an upper rearward slot and a lower forward slot. The slots are provided parallel with each other and at an angle of about 15 degrees with respect top the plane of the windshield. The upper sections of the bottom brackets and the lower sections of the top brackets are slidable with respect to each other and are at outward angles of about 70 degrees from the planes of the recipient surface and the windshield.

Provided last are two pair of primary threaded fasteners. The primary threaded fasteners couple the lower sections of the bottom brackets to the motorcycle. Two pair of secondary threaded fasteners are provided. The secondary threaded fasteners couple the upper sections of the top brackets to the windshield. In this manner the height of the windshield with respect to a motorcycle may be infinitely adjusted, such adjusting being done separately or simultaneously with the adjusting of the angle of the windshield. A bolt is provided. The bolt has a nut. The bolt and nut adjustably couple the circular hole to the lower forward slot. A wing bolt is provided. The wing bolt has a nut. The wing bolt and nut adjustably couple the upper rearward slot to the arcuate slot. In this manner the angle of the windshield with respect to a motorcycle may be infinitely adjusted, such adjusting being done separately or simultaneously with adjusting the height of the windshield.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved motorcycle and windshield mount system which has all of the advantages of the prior art windshield mounts of known designs and configurations and none of the disadvantages.

It is another object of the present invention to provide a new and improved motorcycle and windshield mount system which may be easily and efficiently manufactured and marketed.

It is further object of the present invention to provide a new and improved motorcycle and windshield mount system which is of durable and reliable constructions.

An even further object of the present invention is to provide a new and improved motorcycle and windshield mount system which is susceptible of a low cost of manufacture with regard to both materials and labor, and which accordingly is then susceptible of low prices of sale to the consuming public, thereby making such motorcycle and windshield mount system economically available to the buying public.

Even still another object of the present invention is to provide a motorcycle and windshield mount system for independently and infinitely adjusting the height and angle of a windshield with respect to a motorcycle, such adjusting being done separately or simultaneously.

Lastly, it is an object of the present invention to provide a new and improved motorcycle and windshield mount system, with two pair of brackets, each pair have a bottom bracket and a top bracket. Each bottom bracket has a lower section positioned on a recipient surface. Holes extend through the lower section. The holes are positionable over threaded apertures of a recipient surface. Each bottom bracket has an upper section having a hole forwardly and an arcuate slot rearwardly. Each top bracket has an upper section. The upper section is positionable on a windshield. The upper section has holes. The holes extend through the upper section. The holes are positionable over apertures of a windshield. Each top bracket has a lower section formed with two linear slots, an upper rearward slot and a lower forward slot. The slots are provided parallel with each other and at an angle of about 15 degrees with respect to the plane of a windshield.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
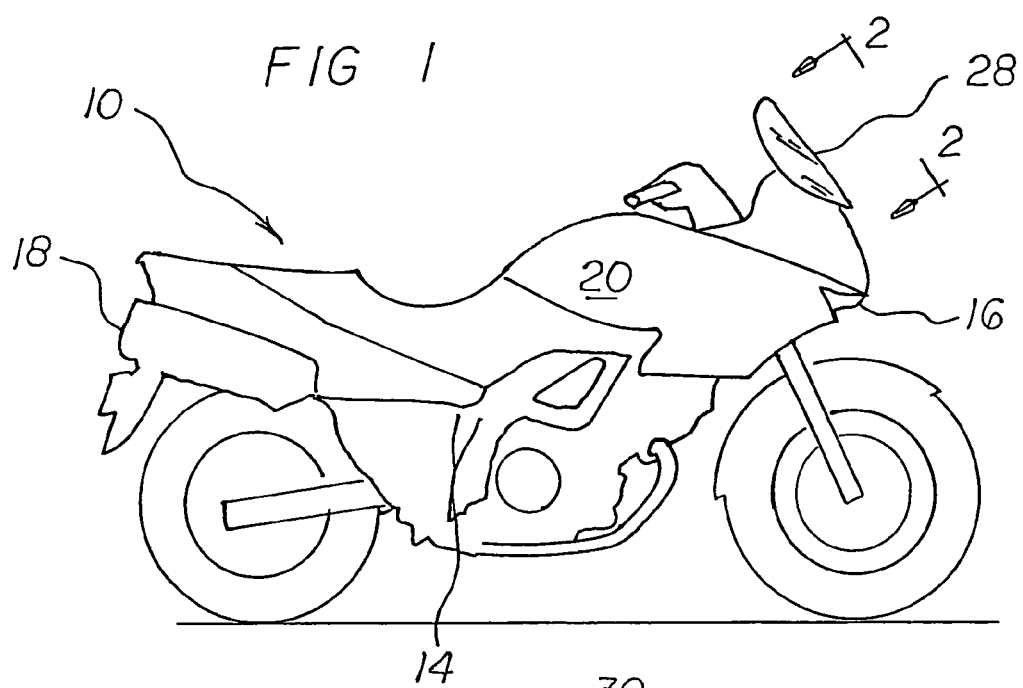
FIG. 1 is a side elevational view of a motorcycle and motorcycle windshield mount system constructed in accordance with the principles of the present invention.
Figure 2:
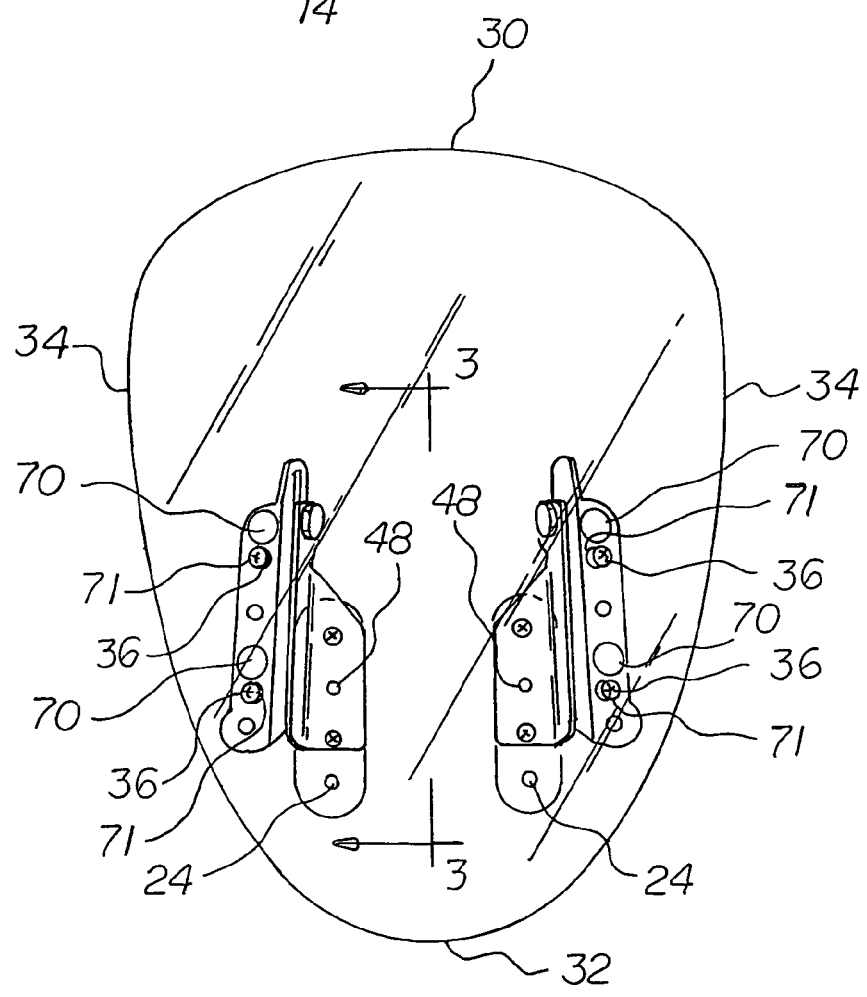
FIG. 2 is a front elevational view of the motorcycle windshield mount system taken at line 2-2 of FIG. 1.
Figure 3:
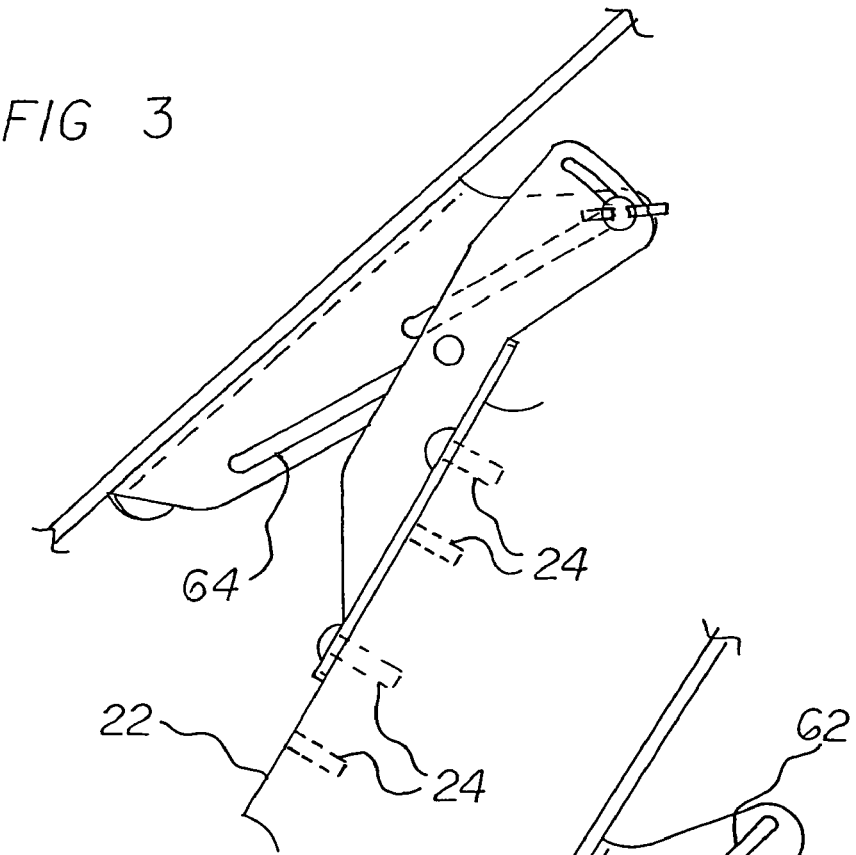
FIG. 3 is a cross sectional view of the motorcycle windshield mount system taken at line 3-3 of FIG. 2.
Figure 4:
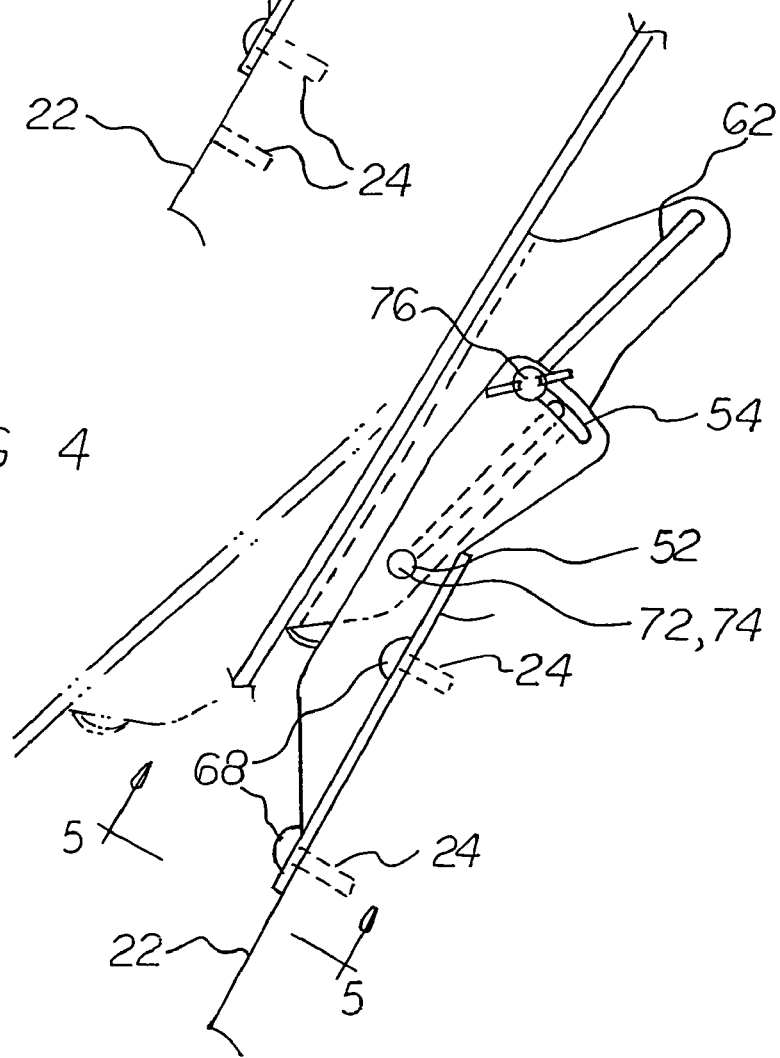
FIG. 4 is a cross sectional view of the motorcycle windshield mount system similar to FIG. 3 but illustrating the windshield in a different orientation.
Figure 5:
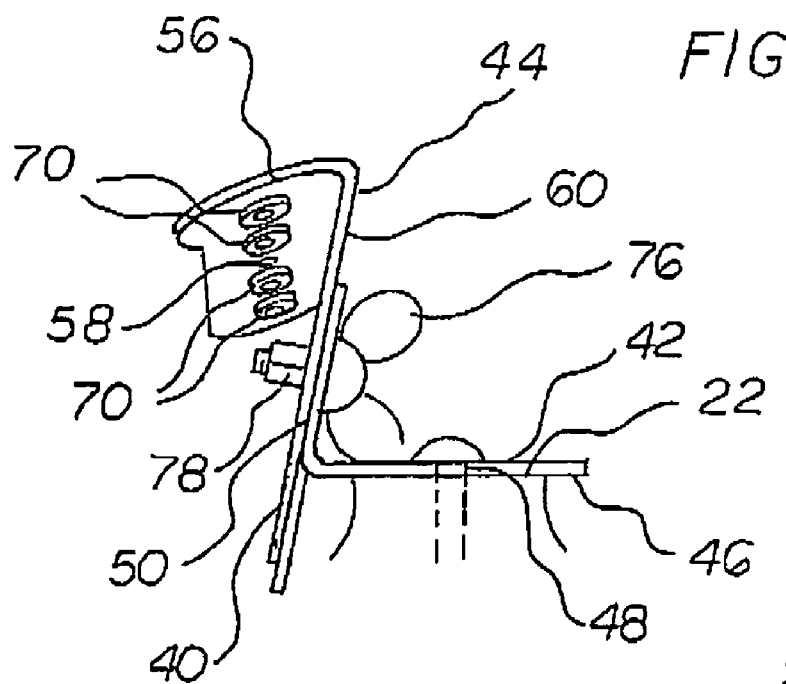
FIG. 5 is a cross sectional view of the motorcycle windshield mount system taken at line 5-5 of FIG. 4.

With reference now to the drawings, and in particular to FIG. 1 thereof, the preferred embodiment of the new and improved motorcycle and windshield mount system embodying the principles and concepts of the present invention and generally designated by the reference numeral 10 will be described.

The present invention, the motorcycle and windshield mount system 10 is comprised of a plurality of components. Such components in their broadest context include two pair of brackets. Such components are individually configured and correlated with respect to each other so as to attain the desired objective.

First provided is a motorcycle 14. The motorcycle has a front 16 and a back 18. The motorcycle has opposite sides 20. A vertical central plane is provided through the motorcycle. The motorcycle has a recipient surface 22. The motorcycle has two rows of four threaded apertures 24. The apertures are aligned parallel with the central plane, equally spaced, and on opposite sides. The recipient surface is in a plane. The plane extends rearwardly at an angle of about 60 degrees from the horizontal.

A windshield 28 is provided. The windshield is fabricated of a transparent, essentially rigid material. The windshield is formed with a top edge 30. The windshield is formed with a bottom edge 32. The windshield is further formed with side edges 34. The windshield has a vertical central plane. The vertical central plane is coextensive with the central plane of the motorcycle. The windshield is essentially in a plane. The windshield has two rows of two apertures 36. The apertures are aligned parallel with the central plane, equally spaced, and on opposite sides. The apertures of the windshield are wider spaced than the apertures of the motorcycle.

Figure 6:
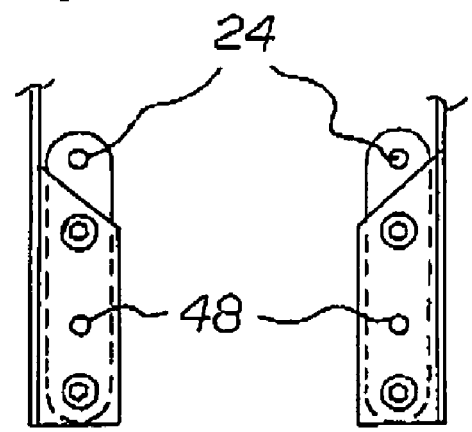
FIG. 6 is a plan view of the bottom brackets coupled to the motorcycle in a retracted orientation.
Figure 7:
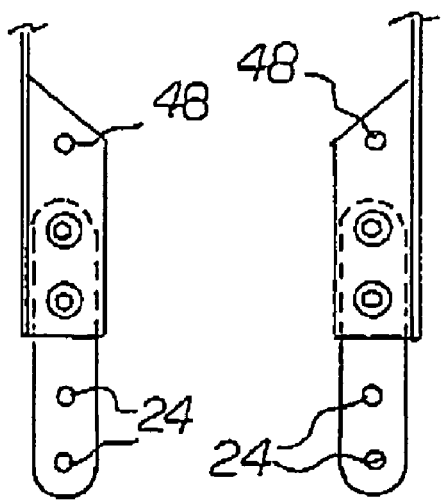
FIG. 7 is a plan view of the bottom brackets coupled to the motorcycle in an advanced orientation.

Further provided are two pair of brackets 40. Each pair of brackets has a bottom bracket 42 and a top bracket 44. Each bottom bracket has a lower section 46. The lower section is positioned on the recipient surface. Three holes 48 are provided in the lower section. The holes are positionable over appropriate threaded apertures of the recipient surface for adjustment front and back. Note FIGS. 6 and 7. Each bottom bracket has an upper section 50. The upper section has a circular hole 52. The circular hole is provided forwardly. The upper section has an arcuate slot 54. The arcuate slot is provided rearwardly. The arcuate slot has a center of curvature at the center of the circular hole. The arcuate slot spans the plane of the recipient surface.

Each top bracket has an upper section 56. The upper section is positioned in contact with the windshield. The upper section has five holes 58. The five holes extend through the upper section. The five holes are positionable over the apertures of the windshield. Each top bracket has a lower section 60. The lower section is formed with two linear slots. The linear slots include an upper rearward slot 62 and a lower forward slot 64. The slots are provided parallel with each other and at an angle of about 15 degrees with respect top the plane of the windshield. The upper sections of the bottom brackets and the lower sections of the top brackets are slidable with respect to each other and are at outward angles of about 70 degrees from the planes of the recipient surface and the windshield.

Provided last are two pair of primary threaded fasteners 68. The primary threaded fasteners couple the lower sections of the bottom brackets to the motorcycle. Two pair of secondary threaded fasteners 70 are provided. Elastomeric inserts 71 fill unused holes. The secondary threaded fasteners couple the upper sections of the top brackets to the windshield. A bolt 72 is provided. The bolt has a nut 74. The bolt and nut adjustably couple the circular hole to the lower forward slot. A wing bolt 76 is provided. The wing bolt has a nut 78. The wing bolt and nut adjustably couple the upper rearward slot to the arcuate slot. In this manner the height of the windshield with respect to a motorcycle may be infinitely adjusted, such adjusting being done separately or simultaneously with adjustment of the angle of the windshield. Further, in this manner the angle of the windshield with respect to a motorcycle may be infinitely adjusted, such adjusting being done separately or simultaneously with adjustment of the height of the windshield.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A windshield mount system comprising:
    two pair of brackets, each pair having a bottom bracket and a top bracket, each bottom bracket having a lower section positioned on a recipient surface with holes extending there through and positionable over threaded apertures of the recipient surface, each bottom bracket having an upper section having a hole forwardly and an arcuate slot rearwardly, each top bracket having an upper section positionable on a windshield with holes extending there through and positionable over apertures of the windshield, each top bracket having a lower section formed with two linear slots, an upper rearward slot and a lower forward slot, the slots being parallel with each other and at an angle of about 15 degrees with respect to a plane of the windshield.

2. The system as set forth in claim 1 and further including two pair of primary threaded fasteners coupling the lower sections of the bottom brackets to a motorcycle, two pair of secondary threaded fasteners coupling the upper sections of the top brackets to a windshield for infinitely adjusting the height of a windshield with respect to a motorcycle, a bolt with a nut adjustably coupling the circular hole to the lower forward slot and a wing bolt with a nut adjustably coupling the upper rearward slot to the arcuate slot for infinitely adjusting the angle of the windshield with respect to the motorcycle.

3. The system as set forth in claim 2 and further including
    the windshield fabricated of a transparent material and formed with a top edge and a bottom edge with side edges and with a vertical central plane coextensive with a central plane of the motorcycle there through, the windshield being essentially in a plane and having two rows of plural apertures aligned parallel with the central plane, equally spaced there from, and on opposite sides thereof.

4. A motorcycle and windshield mount system for independently and infinitely adjusting the height and angle of a windshield with respect to a motorcycle comprising, in combination:
    a motorcycle having a front and a back with opposite sides and with a vertical central plane there through, the motorcycle having a recipient surface with two rows of four threaded apertures aligned parallel with the central plane, equally spaced there from, and on opposite sides thereof, the recipient surface being in a plane extending rearwardly at an angle of about 60 degrees from the horizontal;
    a windshield fabricated of a transparent, essentially rigid material and formed with a top edge and a bottom edge with side edges and with a vertical central plane there through coextensive with the central plane of the motorcycle, the windshield being essentially in a plane and having two rows of two apertures aligned parallel with the central plane, equally spaced there from, and on opposite sides thereof, the apertures of the windshield being wider spaced than the apertures of the motorcycle;
    two pair of brackets, each pair of brackets having a bottom bracket and a top bracket, each bottom bracket having a lower section positioned on the recipient surface with three holes extending there through and positionable over appropriate threaded apertures of the recipient surface for adjustment front and back, each bottom bracket having an upper section having a circular hole forwardly and an arcuate slot rearwardly, the arcuate slot having a center of curvature at the center of the circular hole, the arcuate slot spanning the plane of the recipient surface, each top bracket having an upper section positioned in contact with the windshield with five holes extending there through and positionable over the apertures of the windshield, each top bracket having a lower section formed with two linear slots, an upper rearward slot and a lower forward slot parallel with each other and at an angle of about 15 degrees with respect top the plane of the windshield, the upper sections of the bottom brackets and the lower sections of the top brackets being slidable with respect to each other and being at outward angles of about 70 degrees from the planes of the recipient surface and the windshield; and two pair of primary threaded fasteners coupling the lower sections of the bottom brackets to the motorcycle, two pair of secondary threaded fasteners coupling the upper sections of the top brackets to the windshield, a bolt with a nut adjustably coupling the circular hole to the lower forward slot and a wing bolt with a nut adjustably coupling the upper rearward slot to the arcuate slot for infinitely adjusting the height of the windshield with respect to a motorcycle and for infinitely adjusting the angle of the windshield with respect to a motorcycle, such adjusting being done separately or simultaneously.

* * * * *